United States Patent
Suganuma et al.

(10) Patent No.: US 12,021,188 B2
(45) Date of Patent: Jun. 25, 2024

(54) SULFIDE SOLID ELECTROLYTE, METHOD FOR PRODUCING SULFIDE SOLID ELECTROLYTE, ELECTRODE, AND ALL SOLID STATE BATTERY

(71) Applicant: TOYOTA JIDOSHA KABUSHIKI KAISHA, Toyota (JP)

(72) Inventors: Hikaru Suganuma, Susono (JP); Hanae Shiratori, Susono (JP); Yuki Katoh, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/825,723

(22) Filed: May 26, 2022

(65) Prior Publication Data
US 2022/0285728 A1  Sep. 8, 2022

Related U.S. Application Data

(62) Division of application No. 16/831,938, filed on Mar. 27, 2020, now abandoned.

(30) Foreign Application Priority Data

Apr. 11, 2019  (JP) .................................. 2019-075735

(51) Int. Cl.
*H01M 4/62* (2006.01)
*H01M 4/13* (2010.01)
(Continued)

(52) U.S. Cl.
CPC ......... *H01M 10/0562* (2013.01); *H01M 4/13* (2013.01); *H01M 4/131* (2013.01);
(Continued)

(58) Field of Classification Search
CPC ......... H01M 10/0562; H01M 10/0525; H01M 4/0471; H01M 4/13; H01M 4/131;
(Continued)

(56) References Cited

U.S. PATENT DOCUMENTS

2015/0037689 A1  2/2015 Nishimura et al.
2015/0093652 A1  4/2015 Aihara et al.
(Continued)

FOREIGN PATENT DOCUMENTS

JP  2014191899 A  10/2014
JP  2015232965 A  12/2015
(Continued)

OTHER PUBLICATIONS

Hikaru Suganuma et al., Office Action in U.S. Appl. No. 16/831,938 issued on Jun. 14, 2022.
(Continued)

*Primary Examiner* — Eugenia Wang
(74) *Attorney, Agent, or Firm* — Dickinson Wright, PLLC

(57) ABSTRACT

A main object of the present disclosure is to provide a sulfide solid electrolyte with which an electrode having excellent ion transport efficiency can be obtained. The present disclosure achieves the object by providing a sulfide solid electrolyte comprising: a Li element, a P element, and a S element; wherein a tetrahydrofuran is also included; and BET specific surface area is 8.3 m2/g or more.

9 Claims, 6 Drawing Sheets

(51) Int. Cl.
  *H01M 4/131*    (2010.01)
  *H01M 10/0525*  (2010.01)
  *H01M 10/0562*  (2010.01)
  *H01M 4/02*     (2006.01)

(52) U.S. Cl.
  CPC ......... *H01M 4/62* (2013.01); *H01M 10/0525* (2013.01); *H01M 2004/021* (2013.01); *H01M 2300/0068* (2013.01)

(58) Field of Classification Search
  CPC ...... H01M 4/136; H01M 4/1391; H01M 4/62; H01M 2004/021; H01M 2300/0068
  See application file for complete search history.

(56)          References Cited

U.S. PATENT DOCUMENTS

2018/0138544 A1    5/2018   Sung et al.
2020/0194825 A1    6/2020   Katori et al.

FOREIGN PATENT DOCUMENTS

JP      2018080100 A      5/2018
WO    WO-2019044517 A1 *  3/2019   ............. C01B 17/22

OTHER PUBLICATIONS

Liu et al., Anomalous High Ionic Conductivity of Nanoporous β-Li3PS4, J. Am. Chem. Soc. 2013, 135, 975-978.

* cited by examiner

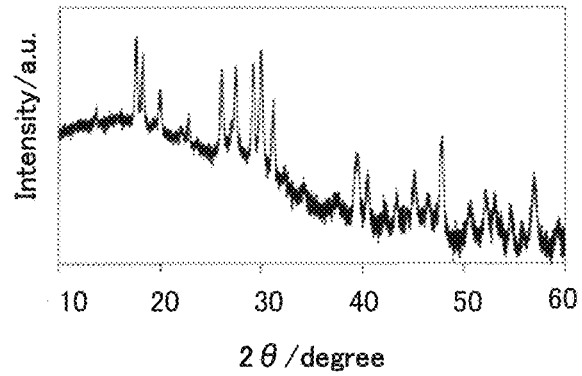
FIG. 4A Example 1
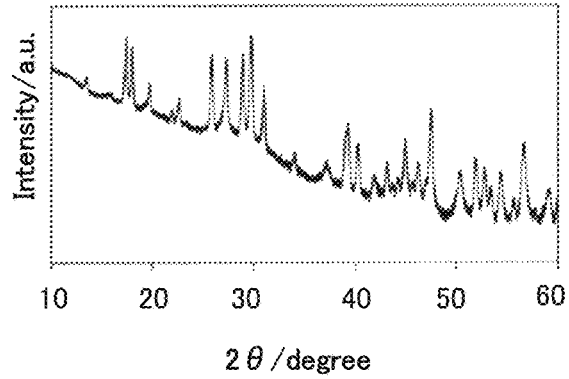
FIG. 4B Example 2
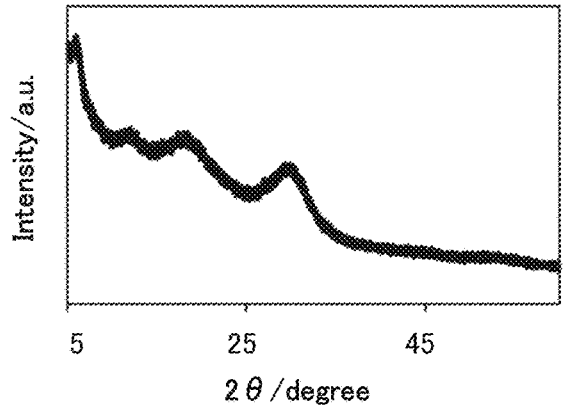
FIG. 4C Example 5
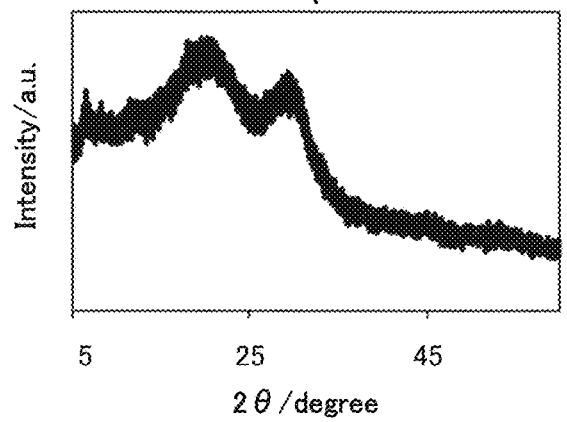
FIG. 4D Example 6
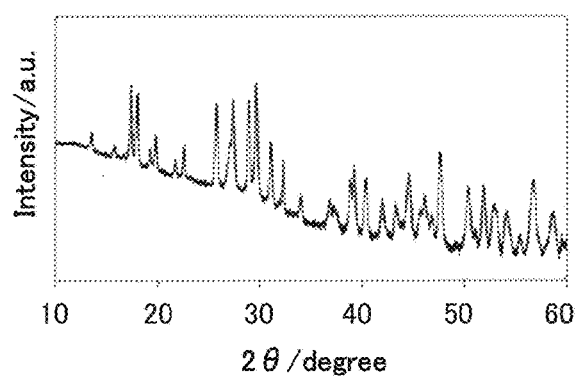
FIG. 4E Comparative Example 1
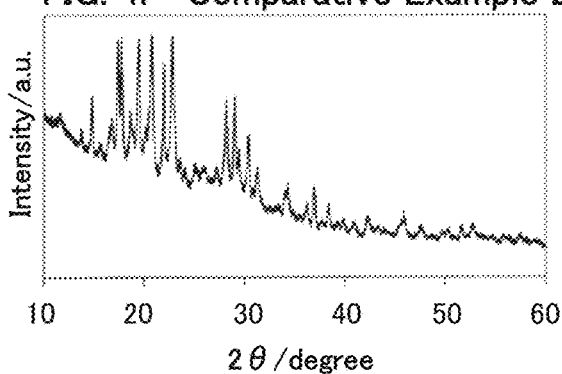
FIG. 4F Comparative Example 2

FIG. 6A Example 1    FIG. 6B Comparative Example 1
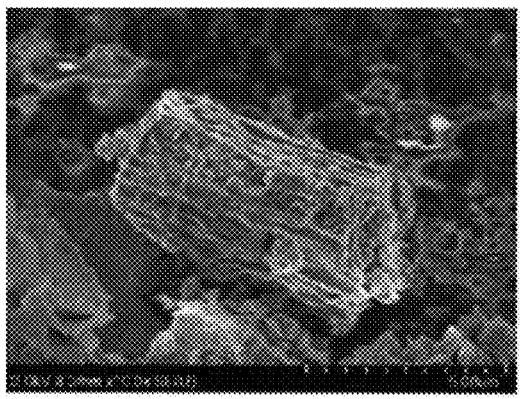
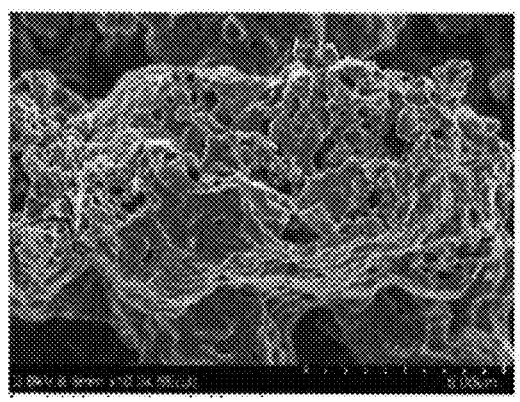
FIG. 7

FIG. 10A 100MPa
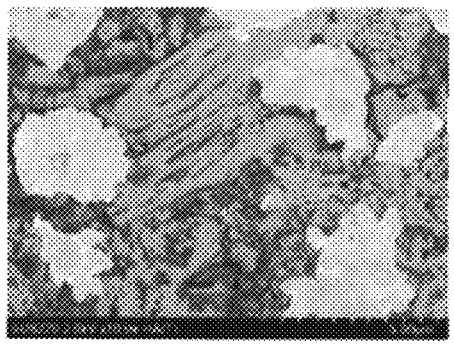
FIG. 10B 200MPa
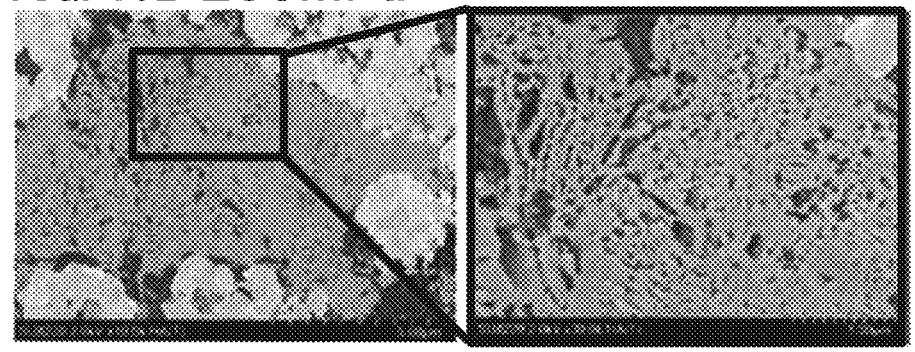
FIG. 10C 400MPa
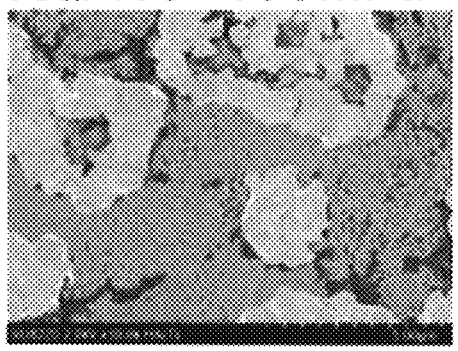
FIG. 10D 600MPa
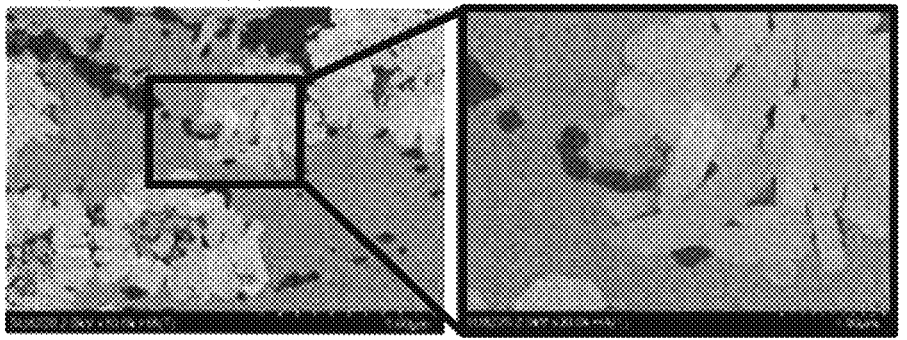

SULFIDE SOLID ELECTROLYTE, METHOD FOR PRODUCING SULFIDE SOLID ELECTROLYTE, ELECTRODE, AND ALL SOLID STATE BATTERY

This application is a divisional application of U.S. Ser. No. 16/831,938, filed on Mar. 27, 2020, which is hereby incorporated by reference in its entirety.

TECHNICAL FIELD

The present disclosure relates to a sulfide solid electrolyte with which an electrode excellent in ion transport efficiency can be obtained.

BACKGROUND ART

In accordance with a rapid spread of information relevant apparatus and communication apparatus such as a personal computer, a video camera and a portable telephone in recent years, the development of a battery to be utilized as a power source thereof has been emphasized. The development of a high-output and high-capacity battery for an electric automobile or a hybrid automobile has been advanced also in fields such as the automobile industry. A lithium ion battery has been presently noticed from the viewpoint of a high energy density among various kinds of batteries.

A liquid electrolyte including a flammable organic solvent is used for a conventionally commercialized lithium battery, so that the installation of a safety device for restraining temperature rise during a short circuit and the structure for preventing the short circuit are necessary therefor. In contrast, the flammable organic solvent is not used in a lithium battery in which the liquid electrolyte is replaced with a solid electrolyte layer to all solidify the battery, so that the simplification of the safety device can be intended.

A sulfide solid electrolyte has been known as a solid electrolyte used in a lithium solid battery. For example, Patent Literature 1 discloses a sulfide solid electrolyte produced by dissolving a precursor fabricated by mechanical milling with a N-methyl formamide, and then drying thereof. Also, Patent Literature 2 discloses a sulfide solid electrolyte produced by mixing $Li_2S$ with $P_2S_5$ in dimethoxy ethane and then drying thereof. Also, Patent Literature 3 discloses a method for producing a sulfide solid electrolyte wherein a slurry including a lithium sulfide is dried in a low temperature environment and as well as in a vacuum state and then crystallized at a high temperature.

CITATION LIST

Patent Literatures

Patent Literature 1: Japanese Patent Application Laid-Open (JP-A) No. 2014-191899
Patent Literature 2: JP-A No. 2015-232965
Patent Literature 3: JP-A No. 2018-080100

SUMMARY OF DISCLOSURE

Technical Problem

Electrodes (a cathode active material layer and an anode active material layer) used in an all solid state battery are required to have excellent ion transport efficiency. The present disclosure has been made in view of the actual circumstances, and the main object thereof is to provide a sulfide solid electrolyte with which an electrode having excellent ion transport efficiency can be obtained.

Solution to Problem

The present disclosure provides a sulfide solid electrolyte comprising: a Li element, a P element, and a S element; wherein a tetrahydrofuran is also included; and BET specific surface area is 8.3 $m^2/g$ or more.

According to the present disclosure, the BET specific surface area is in the specific value, and thus a sulfide solid electrolyte allows an electrode having excellent ion transport efficiency to be obtained. Further, the sulfide solid electrolyte contains a tetrahydrofuran. The tetrahydrofuran is used when the sulfide solid electrolyte is synthesized, and the synthesis is conducted in a specific condition; thus, a sulfide solid electrolyte having high BET specific surface area may be obtained.

In the disclosure, the BET specific surface area may be 13.1 $m^2/g$ or more.

In the disclosure, when intensities obtained by a Raman spectroscopy: an intensity at a peak "a" derived from $PS_4^{3-}$ is regarded as Ia, and an intensity at a peak "b" derived from tetrahydrofuran is regarded as Ib, the ratio Ib/Ia, which is the ratio of the Ib to the Ia, may satisfy $0.0055 \leq Ib/Ia < 0.266$.

In the disclosure, the sulfide solid electrolyte may be amorphous.

In the disclosure, the sulfide solid electrolyte may be crystalline.

The present disclosure also provides a method for producing a sulfide solid electrolyte, the sulfide solid electrolyte being the above described sulfide solid electrolyte, the method comprising: a precursor preparing step of mixing a raw material composition containing the constituent of the sulfide solid electrolyte with tetrahydrofuran to obtain a precursor; and a first burning step of volatilizing the tetrahydrofuran included in the precursor.

According to the present disclosure, the method comprises the first burning step, and thus a sulfide solid electrolyte including a tetrahydrofuran and having a specific BET specific surface area may be produced.

In the disclosure, burning temperature in the first burning step may be a temperature less than the crystallization temperature of the sulfide solid electrolyte, and the sulfide solid electrolyte may be amorphous.

In the disclosure, burning temperature in the first burning step may be 100° C. or less.

In the disclosure, the method may further comprise: a second burning step of improving the crystallinity of the sulfide solid electrolyte after the first burning step; wherein burning temperature in the second burning step is a temperature not less than the crystallization temperature of the sulfide solid electrolyte; and the sulfide solid electrolyte may be crystalline.

In the disclosure, the burning temperature in the second burning step may be 140° C. or more.

The present disclosure also provides an electrode to be used in an all solid state battery, the electrode comprising: an active material and a sulfide solid electrolyte; wherein a tetrahydrofuran is also included; and when the volume rate of the sulfide solid electrolyte inside the electrode is regarded as $\varepsilon$, ion conductivity of the sulfide solid electrolyte is regarded as $\sigma_{SE}$, and ion conductivity of the electrode is regarded as $\sigma_{ele}$, an ionic tortuosity factor obtained from $\varepsilon * \sigma_{SE}/\sigma_{ele}$ is 4.5 or less.

According to the present disclosure, the ionic tortuosity factor is low, and thus the electrode may have excellent ion transport efficiency.

The present disclosure also provides an all solid state battery comprising: a cathode active material layer, an anode active material layer, and a solid electrolyte layer formed between the cathode active material layer and the anode active material layer, wherein at least one of the cathode active material layer and the anode active material layer is the above described electrode.

According to the present disclosure, the above described electrode is included and thus the all solid state battery may have excellent ion transport efficiency.

Advantageous Effects of Disclosure

The sulfide solid electrolyte in the present disclosure exhibits effects such that an electrode having excellent ion transport efficiency may be obtained.

BRIEF DESCRIPTION OF DRAWINGS

FIGS. 4A to 4F are the results of XRD measurement for the sulfide solid electrolytes obtained in Examples 1, 2, 5, and 6, and Comparative Examples 1 and 2.

FIGS. 6A and 6B are SEM images of the sulfide solid electrolyte obtained in Example 1 and Comparative Example 1.

FIG. 7 is a SEM image of the cross-section of the sulfide solid electrolyte obtained in Example 1.

FIGS. 10A and 10D are SEM images of the cross section of a cathode at each pressing pressure during compression powder molding.

DESCRIPTION OF EMBODIMENTS

Figure 1:
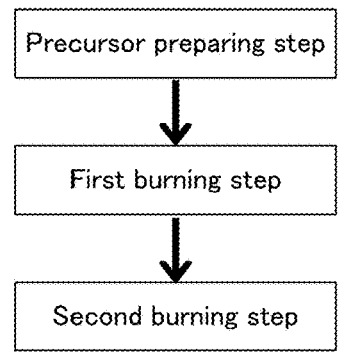
FIG. 1 is a flow chart showing an example of the method for producing a sulfide solid electrolyte in the present disclosure.

The sulfide solid electrolyte, the method for producing the sulfide solid electrolyte, the electrode, and the all solid state battery of the present disclosure are hereinafter described in details.

A. Sulfide Solid Electrolyte

The sulfide solid electrolyte in the present disclosure is a sulfide solid electrolyte comprising: a Li element, a P element, and a S element; wherein a tetrahydrofuran is also included; and BET specific surface area is 8.3 m$^2$/g or more.

According to the present disclosure, the BET specific surface area is in the specific value, and thus the sulfide solid electrolyte allows an electrode having excellent ion transport efficiency to be obtained. Further, the sulfide solid electrolyte contains a tetrahydrofuran. The tetrahydrofuran is used when the sulfide solid electrolyte is synthesized, and the synthesis is conducted in a specific condition; thus, a sulfide solid electrolyte having high BET specific surface area may be obtained. In other words, the tetrahydrofuran is a residue of a solvent added during the production. Also, the sulfide solid electrolyte in the present disclosure is a porous material of which BET specific surface area is large. It is presumed that the interface contact of the sulfide solid electrolyte with active materials would be excellent when such a sulfide solid electrolyte is used in an electrode, since pores are crushed by being pressed. Also, it is presumed that high filling would be possible when the sulfide solid electrolyte is wet by the tetrahydrofuran. As the result, the ionic tortuosity factor in the electrode may be decreased, and thus the ion transport efficiency would be presumably excellent. Details of the ionic tortuosity factor is described later.

Here, Patent Literature 2 discloses that a tetrahydrofuran may be used as a solvent for producing a sulfide solid electrolyte. However, Patent Literature 2 describes that "the remaining organic solvent was completely distilled"; there are no descriptions or suggestions about the idea that the sulfide solid electrolyte contains the solvent (tetrahydrofuran).

The sulfide solid electrolyte in the present disclosure comprises a Li element, a P element, and a S element. Also, it may comprise at least one kind of an O element and a halogen element (such as a F element, a Cl element, a Br element, and an I element). It is preferable that the sulfide solid electrolyte contains an ion conductor including a Li element, a P element, and a S element. The ion conductor may further include an O element. Also, the sulfide solid electrolyte may contain a LiX (X is a halogen element) in addition to the ion conductor.

The ion conductor in the present disclosure preferably mainly contains a $PS_4^{3-}$ structure. The reason therefor is that Li ion conductivity thereof is high. The proportion of the $PS_4^{3-}$ structure to all the anion structures in the ion conductor is, for example, 50 mol % or more, may be 70 mol % or more, and may be 90 mol % or more. Also, the S element in the $PS_4^{3-}$ structure may be substituted with an O element. Also, when the sulfide solid electrolyte contains the ion conductor and a LiX (X is a halogen element), the proportion of the LiX included in the sulfide solid electrolyte is, for example, 5 mol % or more and 35 mol % or less. The sulfide solid electrolyte may contain one kind of halogen element and may contain two kinds or more of halogen element, as the X.

The sulfide solid electrolyte in the present disclosure may be crystalline, and may be amorphous. Incidentally, "amorphous" in the present disclosure refers to the state when peak of the sulfide solid electrolyte is not observed in an X-ray diffraction (XRD) measurement; in other words, the state when the periodicity as a crystal is not observed but so-called halo pattern is observed. On the other hand, "crystalline" refers to the state when the peak of the sulfide solid electrolyte is observed in the XRD measurement. The crystallization temperature of the sulfide solid electrolyte is, for example, 120° C. or more and 200° C. or less. Incidentally, the crystallization temperature ($T_c$) of the sulfide solid electrolyte may be obtained by a differential thermal analysis (DTA).

Also, examples of the shape of the sulfide solid electrolyte may include a prism shape. The average particle size ($D_{50}$) of the sulfide solid electrolyte is, for example, 0.1 μm or more, may be 0.5 μm or more, may be 1 μm or more, and may be 5 μm or more. Meanwhile, the average particle size ($D_{50}$) of the sulfide solid electrolyte is, for example, 50 μm or less, may be 20 μm or less, and may be 10 μm or less. The average particle size ($D_{50}$) may be obtained by, for example, the result of a particle distribution measurement with a laser diffraction scattering method. Also, the ion conductivity is preferably high. The ion conductivity at 25° C. is, for example, $1*10^{-4}$ S/cm or more, and may be $1*10^{-3}$ S/cm or more.

The BET specific surface area of the sulfide solid electrolyte is 8.3 m²/g or more, may be 13.1 m²/g or more, and may be 27.5 m²/g or more. Meanwhile, the BET specific surface area of the sulfide solid electrolyte is, for example, 50 m²/g or less, may be 40 m²/g or less, may be 37.1 m²/g or less, and may be 28.7 m²/g or less. The BET specific surface area may be calculated from, for example, a BET method using a micro pore distribution measurement device. The BET specific surface area may be adjusted by changing the addition amount of tetrahydrofuran and burning conditions in the later described method for producing the sulfide solid electrolyte.

The sulfide solid electrolyte in the present disclosure contains a tetrahydrofuran. The presence or absence of the tetrahydrofuran may be confirmed by, for example, an X-ray diffraction (XRD) measurement and a Raman spectroscopy. Also, the content of the tetrahydrofuran may be obtained by the ratio Ib/Ia, which is the ratio of the Ib, an intensity at a peak "b" from 2850 cm⁻¹ to 3050 cm⁻¹ derived from the tetrahydrofuran, with respect to the Ia, an intensity at a peak "a" in the vicinity of 410 cm⁻¹ derived from $PS_4^{3-}$ when the sulfide solid electrolyte has the $PS_4^{3-}$ structure and the intensities are obtained by a Raman spectroscopy. In the sulfide solid electrolyte in the present disclosure, the Ib/Ia is, for example, 0.0055 or more, may be 0.043 or more, and may be 0.1 or more. Meanwhile, the Ib/Ia is, for example, less than 0.266, may be 0.2 or less, and may be 0.15 or less. If the amount of the tetrahydrofuran is too little, there is a risk that the desired BET specific surface area may not be obtained. On the other hand, if the amount of the tetrahydrofuran is too much, there is a risk that the sulfide solid electrolyte may be condensed. The amount of the tetrahydrofuran may be adjusted by changing burning conditions in the later described method for producing the sulfide solid electrolyte.

B. Method for Producing Sulfide Solid Electrolyte

FIG. 1 is a flow chart showing an example of the method for producing a sulfide solid electrolyte in the present disclosure. The method for producing the sulfide solid electrolyte in the present disclosure comprises: a precursor preparing step of mixing a raw material composition containing the constituent of the sulfide solid electrolyte with a tetrahydrofuran to obtain a precursor; and a first burning step of volatilizing the tetrahydrofuran included in the precursor. Also, the method may further comprise a second burning step of improving the crystallinity of the sulfide solid electrolyte after the first step, as required.

According to the present disclosure, the method comprises the first burning step and thus the sulfide solid electrolyte containing a tetrahydrofuran and having a specific BET specific surface area may be produced.

1. Precursor Preparing Step

The precursor preparing step in the present disclosure is a step of obtaining a precursor by mixing a raw material composition containing the constituent of the above described sulfide solid electrolyte with a tetrahydrofuran.

The raw material composition contains a Li element, a P element, and a S element as its constituents, and may further contain an additional element that is an O element and a halogen element (such as a F element, a Cl element, a Br element, and an I element). Examples of the compound containing a Li element may include a sulfide of Li and an oxide of Li. Specific examples of the sulfide of Li may include $Li_2S$. Specific examples of the oxide of Li may include $Li_2O$. Also, examples of the compound containing a P element may include a simple substance of P, an oxide of P, and a sulfide of P. Specific examples of the sulfide of P may include $P_2S_5$. Specific examples of the oxide of P may include $P_2O_5$. There are no particular limitations on the compound containing a S element; it may be a simple substance, and may be a sulfide. Examples of the sulfide may include the sulfide containing the above described element. The raw material composition may be prepared by mixing these compounds in an arbitrary ratio. When the raw material composition contains $Li_2S$ and $P_2S_5$, the proportion of $Li_2S$ to the total of $Li_2S$ and $P_2S_5$ is, for example, 70 mol % or more, may be 72 mol % or more, and may be 74 mol % or more. Meanwhile, the proportion of $Li_2S$ to the total of $Li_2S$ and $P_2S_5$ is, for example, 80 mol % or less, may be 78 mol % or less, and may be 76 mol % or less.

There are no particular limitations on the tetrahydrofuran; for example, a commercial product may be used. The addition amount of the tetrahydrofuran to the raw material composition in the weight ratio is, for example, the amount 20 times or more of the raw material composition, and may be the amount 30 times or more of the raw material composition. Meanwhile, the amount of the tetrahydrofuran to the raw material composition in the weight ratio is, for example, the amount 50 times or less of the raw material composition, and may be the amount 40 times or less of the raw material composition.

There are no particular limitations on the method for mixing the raw material composition with the tetrahydrofuran, and examples of the method may include a method of stirring them in a glass container such as a beaker using means such as a stirrer. There are no particular limitations on the stirring temperature; for example, it is 25° C. or more, may be 30° C. or more, and may be 35° C. or more. Meanwhile, the stirring temperature is, for example, 50° C. or less, and may be 40° C. or less. Also, there are no particular limitations on the stirring time; for example, it may be 48 hours or more, may be 60 hours or more, and may be 72 hours or more. Meanwhile, the stirring time may be, for example, 120 hours or less, may be 108 hours or less, may be 96 hours or less, and may be 84 hours or less.

2. First Burning Step

The first burning step is a step of volatilizing the tetrahydrofuran included in the precursor.

In the first burning step, the tetrahydrofuran is volatilized from the precursor by burning thereof. There are no particular limitations on the burning temperature in the first burning step if it is a temperature that allows the tetrahydrofuran to be volatilized. The burning temperature may be, for example, a temperature less than the crystallization temperature ($T_c$) of the sulfide solid electrolyte, and may be a temperature not less than the crystallization temperature ($T_c$) of the sulfide solid electrolyte. An amorphous sulfide solid electrolyte may be obtained in the former case, and a crystalline sulfide solid electrolyte may be obtained in the latter case.

In the first burning step, when the burning is to be conducted at a temperature less than the crystallization temperature ($T_c$) of the sulfide solid electrolyte, the burning temperature is, for example, ($T_c$–10° C.) or less, and may be ($T_c$–20° C.) or less. Meanwhile, in the first burning step, when the burning is to be conducted at a temperature not less than the crystallization temperature ($T_c$) of the sulfide solid electrolyte, the burning temperature may be, for example, $T_c$, and may be larger than $T_c$. In the latter case, the burning temperature is, for example, ($T_c$+10° C.) or more and ($T_c$+50° C.) or less. Specific burning temperature in the first burning step may be, for example, 300° C. or less, may be 200° C. or less, may be 140° C. or less, may be 120° C. or less, and may be 100° C. or less. Meanwhile, the burning temperature in the first burning step is, for example, 60° C. or more, may be 70° C. or more, and may be 80° C. or more.

Burning time in the first burning step is, for example, 1 hour or more, may be 12 hours or more, and may be 24 hours or more. Meanwhile, the burning time in the first burning step is, for example, 60 hours or less, 48 hours or less, and may be 36 hours or less.

Burning in the first burning step is preferably conducted in an open system. The open system refers to a system in which the volatilization of the tetrahydrofuran from the precursor is irreversibly possible. Examples thereof may include an atmospheric pressure open system, and a reduced pressure open system. Examples of the reduced pressure open system may include a vacuum drawing.

Also, a drying treatment of drying the precursor may be conducted before the first burning step. The drying temperature is, for example, 10° C. or more and 60° C. or less. Also, examples of drying atmosphere may include an atmosphere of inert gas such as argon.

3. Second Burning Step

In the present disclosure, a second burning step of improving the crystallinity of the sulfide solid electrolyte may be conducted after the first burning step. Thereby, a crystalline sulfide solid electrolyte may be obtained.

Burning temperature in the second burning step is a temperature not less than the crystallization temperature ($T_c$) of the sulfide solid electrolyte. The burning temperature in the second burning step may be, for example, $T_c$, and may be larger than $T_c$. In the latter case, the burning temperature is, for example, ($T_c$+10° C.) or more and ($T_c$+50° C.) or less. Specific burning temperature in the second burning step may be, for example, 140° C. or more, and may be 180° C. or more. Meanwhile, the burning temperature in the second burning step is, for example, 300° C. or less, and may be 200° C. or less. The burning temperature in the first burning step and the burning temperature in the second burning step may be the same temperature, and may be different temperature. In the latter case, the temperature difference thereof is, for example, 10° C. or more.

Burning time of the second burning step is, for example, 6 hours or more, and may be 8 hours or more. Meanwhile, the burning time of the second burning step is, for example, 12 hours or less, and may be 10 hours or less. Burning in the second burning step is preferably conducted in a closed system. Also, burning in the second burning step is preferably conducted in a reduced pressure atmosphere.

4. Sulfide Solid Electrolyte

The sulfide solid electrolyte obtained by each step described above is in the same contents as those described in "A. Sulfide solid electrolyte" above; thus, the description herein is omitted.

C. Electrode

Figure 2:
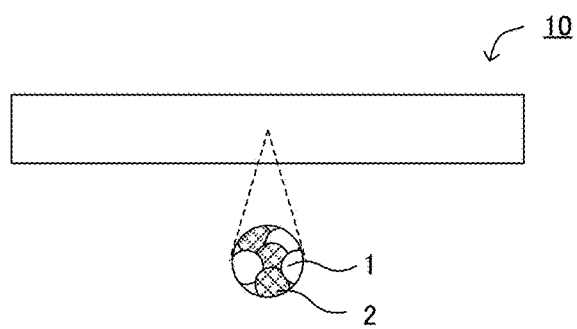
FIG. 2 is a schematic cross-sectional view illustrating an example of the electrode in the present disclosure.

FIG. 2 is a schematic cross-sectional view illustrating an example of the electrode in the present disclosure. Electrode 10 illustrated in FIG. 2 is used in an all solid state battery, and contains active material 1 and sulfide solid electrolyte 2. Further, electrode 10 contains a tetrahydrofuran (not illustrated). Also, when the volume rate of sulfide solid electrolyte 2 inside electrode 10 is regarded as ε, ion conductivity of sulfide solid electrolyte 2 is regarded as $\sigma_{SE}$, and ion conductivity of electrode 10 is regarded as $\sigma_{ele}$, an ionic tortuosity factor obtained from $\varepsilon^* \sigma_{SE}/\sigma_{ele}$ is 4.5 or less.

According to the present disclosure, the ionic tortuosity factor is low, and thus the electrode may have excellent ion transport efficiency. Also, usually, the sulfide solid electrolyte included in the electrode contains a tetrahydrofuran. The tetrahydrofuran is used when the sulfide solid electrolyte is synthesized, and the synthesis is conducted in a specific condition; thus, a sulfide solid electrolyte having high BET specific surface area may be obtained. Usage of such a sulfide solid electrolyte allows an electrode to have excellent ion transport efficiency.

The ionic tortuosity factor in the present disclosure is 4.5 or less, may be 4.0 or less, and may be 3.5 or less. The ionic tortuosity factor is an index defined as follows: the ion conductivity of the electrode here to the peculiar ion conductivity of its solid electrolyte becomes the slower as the ion inside the electrode bend the more; thus, an effective ion conductivity $K_{eff}$ of the electrode may be represented as a following formula:

$$K_{eff} = \varepsilon^* K/\tau.$$

Here, ε is the volume rate of the sulfide solid electrolyte in the electrode, K is the ion conductivity of the sulfide solid electrolyte, and τ is the ionic tortuosity factor; thus, the ionic tortuosity factor may be represented by a following formula:

$$\tau = \varepsilon^* K/K_{eff}.$$

It means that the effective ion conductivity $K_{eff}$ of the electrode is the higher when τ is the smaller. K may be obtained by measuring the ion conductivity $\sigma_{SE}$ of the sulfide solid electrolyte. $K_{eff}$ may be obtained by measuring the ion conductivity $\sigma_{ele}$ of the electrode.

The electrode in the present disclosure contains an active material and a sulfide solid electrolyte. The electrode may further contain at least one of a conductive material and a binder. The sulfide solid electrolyte included in the electrode is preferably the one the sulfide solid electrolyte described in "A. Sulfide solid electrolyte" above is compressed.

The active material may be a cathode active material and may be an anode active material. Examples of the cathode active material may include a rock salt bed type active material such as lithium cobaltate ($LiCoO_2$), lithium nickelate ($LiNiO_2$) and $LiNi_{1/3}Co_{1/3}Mn_{1/3}O_2$; a spinel type active material such as lithium manganate ($LiMn_2O_4$) and $Li(Ni_{0.5}Mn_{1.5})O_4$; and an olivine type active material such as lithium titanate ($Li_4Ti_5O_{12}$), $LiFePO_4$, $LiMnPO_4$, $LiCoPO_4$, and $LiNiPO_4$. The shape of the cathode active material may be a shape such as a particle shape and a thin film shape. When the cathode active material is in a particle shape, the cathode active material may be a primary particle, and may be a secondary particle. Also, the average particle size ($D_{50}$) of the cathode active material is, for example, preferably 1 nm or more and 100 μm or less, and more preferably 10 nm or more and 30 μm or less.

On the other hand, examples of the anode active may include a metal active material and a carbon active material. Examples of the metal active material may include In, Al, Si, and Sn. Meanwhile, examples of the carbon material may include mesocarbon microbeads (MCMB), highly oriented pyrolytic graphite (HOPG), hard carbon, and soft carbon. Also, for example, a metal oxide such as lithium titanate ($Li_4Ti_5O_{12}$) may be used. The shape of the anode active material may be, for example, a shape such as a particle shape and a thin film shape. When the anode active material is in a particle shape, the anode active material may be a primary particle and may be a secondary particle. Also, the average particle size ($D_{50}$) of the anode active material is, for example, preferably 1 nm or more and 100 μm or less, and more preferably 10 nm or more and 30 μm or less.

Also, the electrode in the present disclosure may contain a conductive material and a binder as required. Examples of the conductive material may include a carbon material. Examples of the binder may include a fluorine-based binder such as polyvinylidene fluoride (PVdF), and a rubber-based binder such as butylene rubber (BR).

There are no particular limitations on the thickness of the electrode; for example, it is 0.1 μm or more and 1000 μm or less.

There are no particular limitations on the method for producing the electrode in the present disclosure. Examples of the method for producing the electrode may include a method comprising a preparing step of preparing an electrode mixture by mixing the sulfide solid electrolyte described in "A. Sulfide solid electrolyte" above, an active material, and a dispersion medium, and then drying the mixture; and a pressing step of pressing the electrode mixture.

The sulfide solid electrolyte and the active material are as described above. Also, examples of the dispersion medium may include an organic solvent such as heptane. There are no particular limitations on the mixing and the drying, and conventionally known methods may be used. There are no particular limitations on the pressing step either, and examples of the step may include a method of uniaxially pressing the electrode mixture at the pressure of 100 MPa or more and 600 MPa or less.

D. All Solid State Battery

Figure 3:
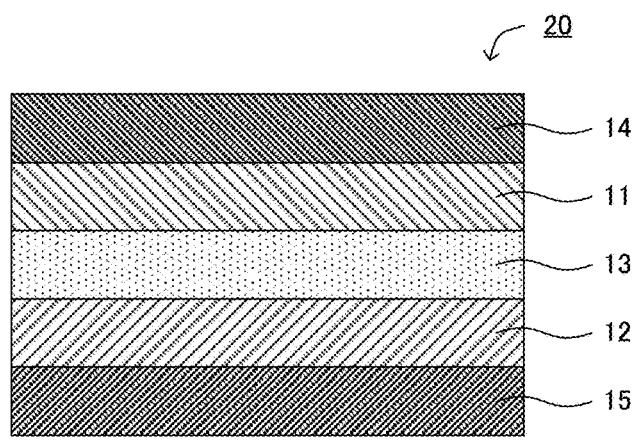
FIG. 3 is a schematic cross-sectional view illustrating an example of the all solid state battery in the present disclosure.

FIG. 3 is a schematic cross-sectional view illustrating an example of the all solid state battery in the present disclosure. All solid state battery 20 illustrated in FIG. 3 comprises cathode active material layer 11, anode active material layer 12, solid electrolyte layer 13 formed between cathode active material layer 11 and anode active material layer 12, cathode current collector 14 for collecting currents of cathode active material layer 11, and anode current collector 15 for collecting currents of anode active material layer 14. Further, at least one of cathode active material layer 11 and anode active material layer 12 is the above described electrode.

According to the present disclosure, the above described electrode is used and thus the all solid state battery may have excellent ion transport efficiency.

1. Cathode Active Material Layer and Anode Active Material Layer

At least one of the cathode active material layer and the anode active material layer is the electrode described in "B. Electrode" above. Just the cathode active material layer may be the above described electrode, and just the anode active material layer may be the above described electrode. Also, both of the cathode active material layer and the anode active material layer may be the above described electrode.

2. Cathode Current Collector and Anode Current Collector

The cathode current collector and the anode current collector respectively have a function of collecting electrons of the cathode active material layer and the anode active material layer. There are no particular limitations on the cathode current collector and the anode current collector, and conventionally known cathode current collector and anode current collector used in an all solid state battery may be used. Examples of the cathode current collector may include Al and SUS. Examples of the anode current collector may include Cu and Ni. Incidentally, the thickness and the shape of the cathode current collector and the anode current collector may be appropriately selected depending on the applications of the batteries.

3. Solid Electrolyte Layer

The solid electrolyte layer is a layer formed between the cathode active material layer and the anode active material layer. Also, the solid electrolyte layer contains at least a solid electrolyte, and may further contain a binder as required.

There are no particular limitations on the solid electrolyte, and a conventionally known solid electrolyte used in an all solid state battery may be used; however, it is preferably the same as the above described sulfide solid electrolyte included in the electrode. The binder is in the same contents as those described in "B. Electrode" above.

There are no particular limitations on the thickness of the solid electrolyte layer; for example, it is 0.1 μm or more and 1000 μm or less.

4. All Solid State Battery

The all solid state battery in the present disclosure is preferably an all solid lithium ion battery. Also, the all solid state battery in the present disclosure may be a primary battery and may be a secondary battery, but the latter is preferable. The reason therefor is that it may be repeatedly charged and discharged and useful as a car-mounted battery, for example. Incidentally, the secondary battery includes the usage of the secondary battery as a primary battery (usage for the purpose of just discharging once after being charged). Examples of the shape of the all solid state battery may include a coin shape, a laminate shape, a cylindrical shape, and a square shape. Also, the all solid state battery may comprise just one power generating element, and may comprise two or more thereof. In the latter case, a plurality of the power generating elements may be connected in parallel, and may be connected in series.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Fabrication of Sulfide Solid Electrolyte>

$Li_2S$ and $P_2S_5$ were weighed so as to be $Li_2S:P_2S_5=75:25$ in the molar ratio, and thereby a raw material composition was obtained. This raw material composition and a tetrahydrofuran 20 times of the raw material composition in the weight ratio were put in a container made of glass, stirred at 25° C. for 72 hours, and then precipitated powder was collected as the precursor of a sulfide solid electrolyte. The collected precursor was dried at 25° C. under an argon atmosphere, and then burned at 100° C. under an atmospheric pressure (open system) for 1 hour (first burning). Obtained burned substance was vacuum sealed in a quartz tube, and the quartz tube was burned at 140° C. in a muffle furnace for 12 hours (second burning), and thereby a sulfide solid electrolyte was fabricated.

<Fabrication of Cathode Mixture>

An oxide active material ($LiNi_{1/3}Co_{1/3}Mn_{1/3}O_2$), the sulfide solid electrolyte, and a conductive material (VGCF) were projected into heptane, stirred by an ultrasonic homogenizer, and then the mixture was dried to fabricate a cathode mixture. Incidentally, the oxide active material and the sulfide solid electrolyte were in the volume ratio of the oxide active material:the sulfide solid electrolyte=40:60, and the conductive material was 2 volume %.

<Fabrication of Cathode>

The cathode mixture of 100 mg was projected into a cylinder having a diameter of 11.28 mm, pressure of 600 MPa was applied thereto using a uniaxial pressing machine to form a pellet, and thereby a cathode was fabricated.

Example 2

The first burning was conducted in the same manner as in Example 1. The burned substance obtained by the first burning was vacuum drawn at 140° C. for 12 hours using a specimen dryer (second burning), and thereby a sulfide solid electrolyte was fabricated. A sulfide solid electrolyte and a cathode were fabricated in the same manner as in Example 1, except that the obtained sulfide solid electrolyte was used.

Example 3

A sulfide solid electrolyte and a cathode were fabricated in the same manner as in Example 1, except that the burning temperature and the burning time in the first burning were changed to 80° C. and 2 hours, and the second burning was not conducted.

Example 4

A sulfide solid electrolyte and a cathode were fabricated in the same manner as in Example 1, except that the burning temperature in the second burning was changed to 300° C.

Example 5

A sulfide solid electrolyte and a cathode were fabricated in the same manner as in Example 1, except that the first burning was burning while vacuum drawing at 80° C. for 48 hours, and the second burning was not conducted.

Example 6

A sulfide solid electrolyte and a cathode were fabricated in the same manner as in Example 1, except that the first burning was burning at 80° C. for 12 hours under atmospheric pressure (open system), and the second burning was not conducted.

Comparative Example 1

$Li_2S$ and $P_2S_5$ were weighed so as to be $Li_2S:P_2S_5$=75:25 in the molar ratio to obtain a mixture powder. The obtained mixture powder was subjected to mechanical milling using a planetary ball mill with the conditions of 600 rpm and for 24 hours. After that, the mixture was burned at 550° C. under an argon atmosphere, and thereby a sulfide solid electrolyte was fabricated. A sulfide solid electrolyte and a cathode were fabricated in the same manner as in Example 1, except that the obtained sulfide solid electrolyte was used.

Comparative Example 2

A sulfide solid electrolyte and a cathode were fabricated in the same manner as in Example 2, except that the first burning was not conducted, and the vacuum drawing was not conducted in the second burning.

[Evaluation]

<X-Ray Diffraction Measurement>

An X-ray diffraction (XRD) measurement using a CuKα ray was conducted to the sulfide solid electrolytes obtained in Examples 1 to 6 and Comparative Examples 1 and 2. Representative results are shown in FIGS. 4A to 4F. As shown in FIGS. 4A to 4F, the peak of $β-Li_3PS_4$ was confirmed in Examples 1, 2, and Comparative Example 1, which means it was confirmed to be crystalline. On the other hand, the peak of $β-Li_3PS_4$ was not confirmed in Comparative Example 2. It is considered to be a peak shape of the state where tetrahydrofuran remained in a large amount since the first burning was not conducted and just the second burning without vacuum drawing was conducted. Also, halo peak was confirmed in Examples 5 and 6, which means it was confirmed that the sulfide solid electrolyte was amorphous. Also, although not illustrated, Example 3 was confirmed to be amorphous in the same manner as Examples 5 and 6.

<Raman Spectroscopy>

Figure 5:
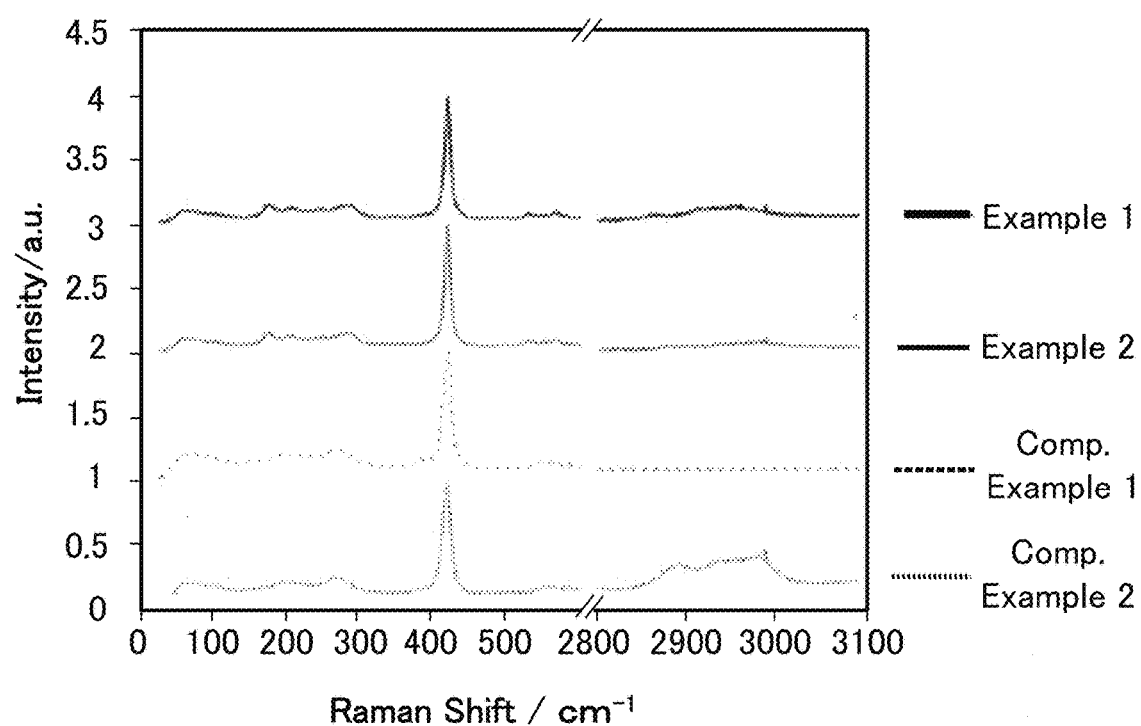
FIG. 5 is the results of Raman spectroscopy for the sulfide solid electrolytes obtained in Examples 1 and 2, and Comparative Examples 1 and 2.

Raman spectroscopy was conducted to the sulfide solid electrolytes obtained in Examples 1 to 6, and Comparative Examples 1 and 2. A representative result is shown in FIG. 5. As shown in FIG. 5, the peak derived from tetrahydrofuran at 2850 $cm^{-1}$ to 3050 $cm^{-1}$ was confirmed in Examples 1, 2, and Comparative Example 2. In particular, it was confirmed that a large amount of tetrahydrofuran was included in Comparative Example 2. Also, intensity Ia at a peak "a" derived from $PS_4^{3-}$ in the vicinity of 410 $cm^{-1}$ and intensity Ib at a peak "b" derived from tetrahydrofuran at 2850 $cm^{-1}$ to 3050 $cm^{-1}$ were obtained and Ib/Ia was calculated. The results are shown in Table 1.

<SEM Observation>

The sulfide solid electrolytes obtained in Examples 1 to 6 and Comparative Examples 1 and 2 were observed with SEM (scanning electron microscope). As shown in FIG. 6A, it was confirmed that the sulfide solid electrolyte obtained in Example 1 had a prism structure having a size of approximately 5 μm to 20 μm. On the other hand, as shown in FIG. 6B, it was confirmed that the sulfide solid electrolyte obtained in Comparative Example 1 did not have the prism structure, which was a different result from that of Example 1.

Also, the sulfide solid electrolyte obtained in Example 1 was sealed with a resin and cut, and the cross-section thereof was observed. The result is shown in FIG. 7. As shown in FIG. 7, it was confirmed that the sulfide solid electrolyte obtained in Example 1 had a porous structure. It is presumed that such a porous structure was formed when THF was volatilized during the fabrication of the sulfide solid electrolyte.

<Measurement of BET Specific Surface Area>

BET specific surface area of the sulfide solid electrolytes obtained in Examples 1 to 6 and Comparative Examples 1 and 2 was respectively measured. In specific, it was confirmed by the calculation from BET method using a micropore distribution measurement device. The results are shown in Table 1.

<Measurement of Filling Rate>

Filling rate of the sulfide solid electrolytes obtained in Examples 1, 2, 4, and Comparative Example 1 during being pressed was respectively measured. In specific, the sulfide solid electrolyte of 100 mg was uniaxially pressed at the pressure of 600 MPa to form a pellet, and then the height of the pellet was measured to calculate the volume. Then, the volume obtained from the true density was divided by the above calculated volume, and thereby the filling rate during being pressed was obtained. The results are shown in Table 1.

<Measurement of Ionic Tortuosity Factor>

The ionic tortuosity factor of the cathodes obtained in Examples 1 to 6 and Comparative Examples 1 and 2 was respectively measured. First, the conductivity $\sigma_{SE}$ of the solid electrolyte was obtained. In specific, an impedance measurement was conducted to the pellet obtained by uniaxially pressing the fabricated sulfide solid electrolyte of 100 mg at 600 MPa. From the resistance value of the half circle in the obtained Nyquist diagram and the thickness of the pellet, $\sigma_{SE}$ was calculated.

Figure 8:
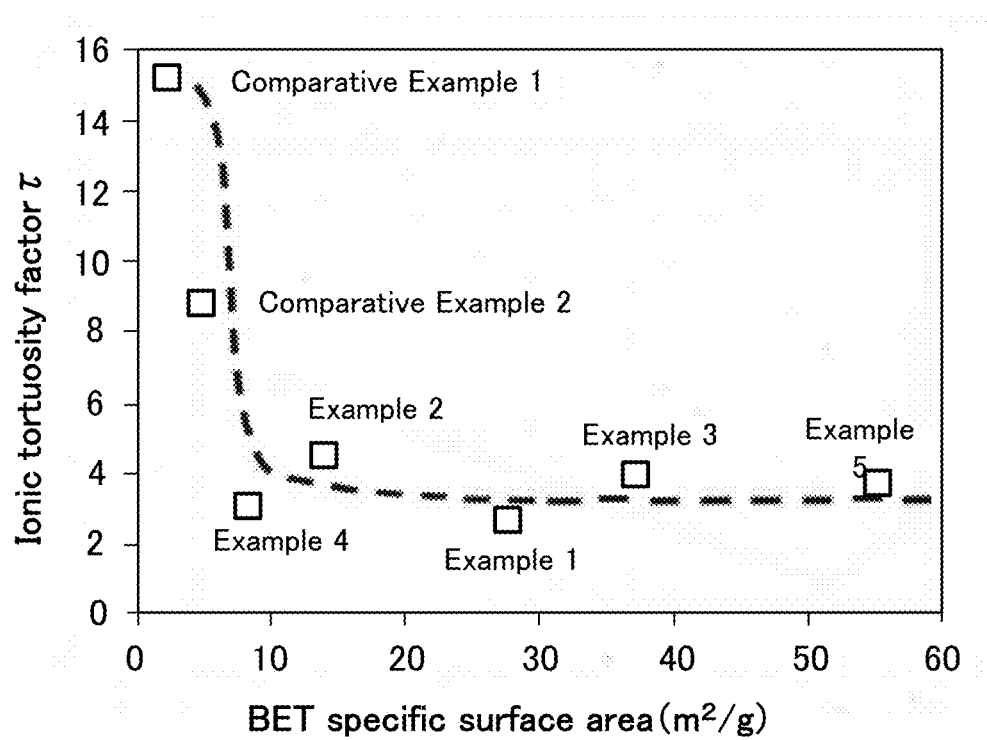
FIG. 8 is a graph showing the relation between BET specific surface area and ionic tortuosity factor.

Next, the conductivity $\sigma_{ele}$ of the electrode was obtained. In specific, top and bottom of the fabricated cathode was sandwiched by the sulfide solid electrolyte, top and bottom of the product was further sandwiched by a Li foil, and the product was used as a sample. The impedance measurement was conducted to the sample. Based on the resistance value of the half circle in the obtained Nyquist diagram and the thickness of the cathode, $\sigma_{ele}$ was calculated. The volume rate ε of the sulfide solid electrolyte was obtained from the volume rate of the sulfide solid electrolyte used in each Example and each Comparative Example. The ionic tortuosity factor (τ) was calculated from ε, $\sigma_{SE}$, and $\sigma_{ele}$ using the below formula. The results are shown in FIG. 8 and Table 1.

Ionic tortuosity factor $(\tau) = \varepsilon \cdot \sigma_{SE} / \sigma_{ele}$

TABLE 1

|  | Ib/Ia | BET specific surface area (m²/g) | Filling rate (%) | Ionic tortuosity factor |
|---|---|---|---|---|
| Example 1 | 0.043 | 27.5 | 98.1 | 2.7 |
| Example 2 | 0.0055 | 13.9 | 96.7 | 4.5 |
| Example 3 | 0.135 | 37.1 | — | 4.1 |
| Example 4 | 0.0031 | 8.3 | 97.4 | 3.0 |
| Example 5 | 0.066 | 55 | — | 3.7 |
| Example 6 | 0.118 | 38 | — | 3.9 |
| Comp. Example 1 | 0 | 2.2 | 86.5 | 15.2 |
| Comp. Example 2 | 0.226 | 4.78 | — | 8.8 |

As shown in FIG. 8 and Table 1, in Examples 1 to 6, wherein the tetrahydrofuran was included and the BET specific surface area was 8.3 m²/g or more, the ionic tortuosity factor was 4.5 or less. On the other hand, the ionic tortuosity factor in Comparative Examples 1 and 2 was 8.8 or more. In particular, it was confirmed that the ionic tortuosity factor sharply dropped when the BET specific surface area was 8.3 m²/g or more. Also, the filling rates of Examples 1, 2, and 4 were higher than that of Comparative Example 1. It was considered that the sulfide solid electrolyte obtained in each Example had high filling rate since it had the porous structure. Further, it can be said that the sulfide solid electrolyte obtained in each Example was in wet state since a small amount of THF was included. There is a possibility the filling rate became high for that reason.

Reference Examples 1 to 7

Figure 9:
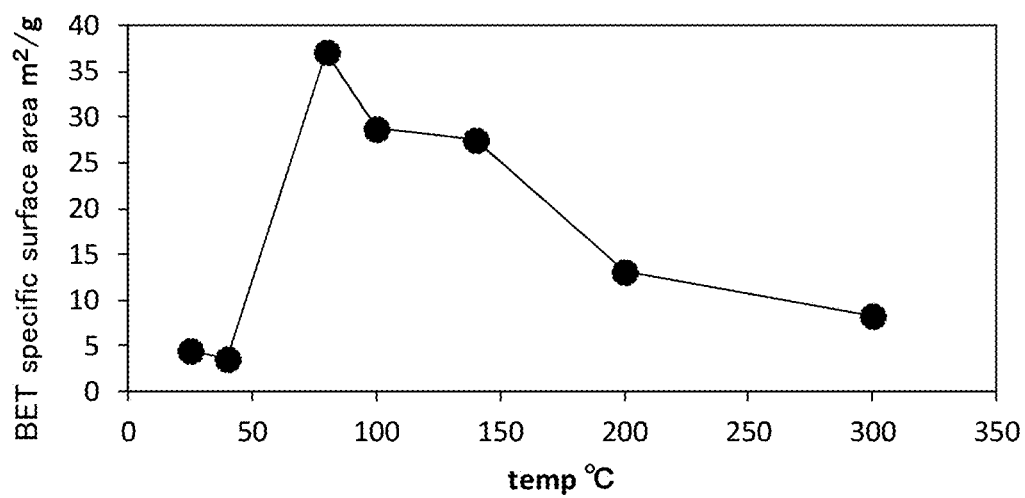
FIG. 9 is a graph showing the relation between burning temperature (heat treatment temperature) and BET specific surface area.

The relation between the burning temperature (heat treatment temperature) in the first burning and the BET specific surface area of the sulfide solid electrolyte to be obtained was studied. The results are shown in FIG. 9 and Table 2. Incidentally, Reference Examples 3 and 5 in FIG. 9 and Table 2 respectively corresponds to the above described Examples 3 and 1.

TABLE 2

|  | Burning temperature (Heat treatment temperature) | BET specific surface area (m²/g) |
|---|---|---|
| Ref. Example 1 | 25 | 4.5 |
| Ref. Example 2 | 40 | 3.6 |
| Ref. Example 3 | 80 | 37.1 |
| Ref. Example 4 | 100 | 28.7 |
| Ref. Example 5 | 140 | 27.5 |
| Ref. Example 6 | 200 | 13.1 |
| Ref. Example 7 | 300 | 8.3 |

As shown in FIG. 9 and Table 2, it was confirmed that the change of burning temperature (heat treatment temperature) affected the BET specific surface area. In particular, it was confirmed that the BET specific surface area was maximum at 80° C., and there was a tendency BET specific surface area diminished when the temperature was raised over 80° C. It was presumed that the tetrahydrofuran was instantly volatilized in the vicinity of 80° C. to form porous and thus the BET specific surface area was enlarged. Also, it was presumed that the porous structure was burned to be solidified and crushed over 80° C. and thus the BET specific surface area was diminished. In this manner, the improvement of the BET specific surface area was not confirmed when the burning temperature was simply raised.

Reference Example 8

A cathode was fabricated in the same manner as in Example 1 except that the pressing pressure during compression powder molding was changed to 100 MPa, 200 MPa, and 400 MPa, and the SEM images of the cross-section of each cathode were obtained. The SEM images are shown in FIGS. 10A to 10D along with the SEM image of the cross-section of the cathode in Example 1.

As shown in FIGS. 10A to 10D, it was confirmed that the sulfide solid electrolyte was crushed at the pressing pressure of 200 MPa and fine particles having 10 nm to 200 nm were formed, and thus higher filling rate was achieved compared to 100 MPa. Then, at the pressing pressure of 600 MPa, there was almost no gap and filled. In this manner, in the electrode in the present disclosure, it was presumed that the high filling rate was achieved not because of the usage of a sulfide solid electrolyte having a small particle size from the beginning, but because the sulfide solid electrolyte became fine particles due to the pressing pressure.

Reference Sings List 1 active material
2 sulfide solid electrolyte
10 electrode
11 cathode active material layer
12 anode active material layer
13 solid electrolyte layer
14 cathode current collector
15 anode current collector
20 all solid state battery

What is claimed is:
1. A method for producing a sulfide solid electrolyte, the sulfide solid electrolyte comprising: a Li element, a P element, and a S element; wherein a tetrahydrofuran is also included; and BET specific surface area is 8.3 m²/g or more, the method comprising:

a precursor preparing step of mixing a raw material composition containing the constituent of the sulfide solid electrolyte with the tetrahydrofuran to obtain a precursor; and a first burning step of volatilizing the tetrahydrofuran included in the precursor, wherein when intensities obtained by a Raman spectroscopy: an intensity at a peak "a" derived from $PS_4^{3-}$ is regarded as Ia, and an intensity at a peak "b" derived from tetrahydrofuran is regarded as Ib, the ratio Ib/Ia, which is the ratio of the Ib to the Ia, satisfies $0.0031 \leq Ib/Ia < 0.226$.

2. The method for producing the sulfide solid electrolyte according to claim 1, wherein the ratio Ib/Ia satisfies $0.0031 \leq Ib/Ia \leq 0.135$, and the BET specific surface area is 8.3 m²/g or more and 55 m²/g or less.

3. The method for producing the sulfide solid electrolyte according to claim 1, wherein the method further comprising a second burning step of improving the crystallinity of the sulfide solid electrolyte after the first burning step, the burning temperature in the first burning step is 70° C. or more and 120° C. or less, and the burning temperature in the second burning step is 140° C. or more and 300° C. or less, the ratio Ib/Ia satisfies $0.0031 \leq Ib/Ia \leq 0.043$, and the BET specific surface area is 8.3 m²/g or more and 27.5 m²/g or less.

4. The method for producing a sulfide solid electrolyte according to claim 1, the method further comprising:

a second burning step of improving the crystallinity of the sulfide solid electrolyte after the first burning step, wherein burning in the first burning step is conducted in an open system, and burning in the second burning step is conducted in a reduced pressure atmosphere.

5. The method for producing the sulfide solid electrolyte according to claim 4, wherein the burning temperature in the first burning step is 100° C. or less.

6. The method for producing the sulfide solid electrolyte according to claim 4, wherein the burning temperature in the second burning step is a temperature not less than the crystallization temperature of the sulfide solid electrolyte; and the sulfide solid electrolyte is crystalline.

7. The method for producing the sulfide solid electrolyte according to claim 6, wherein the burning temperature in the second burning step is 140° C. or more.

8. The method for producing the sulfide solid electrolyte according to claim 4, wherein a drying treatment of drying the precursor is conducted before the first burning step.

9. The method for producing the sulfide solid electrolyte according to claim 4, wherein the burning time in the second burning step is 6 hours or more and 12 hours or less.

* * * * *